(12) United States Patent
Lee et al.

(10) Patent No.: US 12,360,238 B2
(45) Date of Patent: Jul. 15, 2025

(54) VEHICLE RADAR APPARATUS AND METHOD OF CONTROLLING THE SAME

(71) Applicant: HL KLEMOVE CORP., Incheon (KR)

(72) Inventors: Jingu Lee, Gyeonggi-do (KR); Han Byul Lee, Seoul (KR); JungHwan Choi, Seoul (KR); Jae Hyun Han, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 513 days.

(21) Appl. No.: 17/857,851

(22) Filed: Jul. 5, 2022

(65) Prior Publication Data

US 2023/0003518 A1    Jan. 5, 2023

(30) Foreign Application Priority Data

Jul. 5, 2021  (KR) ........................ 10-2021-0088011

(51) Int. Cl.
*G01B 15/02*        (2006.01)
*G01S 13/931*       (2020.01)

(52) U.S. Cl.
CPC .................. *G01S 13/931* (2013.01)

(58) Field of Classification Search
CPC ..... G01B 15/02; G01S 13/882; G01S 13/931; G01S 7/02; G01S 13/42; G01S 13/46; G01S 2013/462
See application file for complete search history.

(56) References Cited

U.S. PATENT DOCUMENTS 5,278,564 A * 1/1994 Groenenboom .... G01S 13/4418
                                                 342/123
6,266,005 B1 * 7/2001 Schneider ............... G01S 13/46
                                                 342/25 R (Continued)

FOREIGN PATENT DOCUMENTS

KR    10-2004-0094845    11/2004
KR    10-2019-0117902    10/2019

OTHER PUBLICATIONS

Office Action dated Oct. 29, 2024 for Korean Patent Application No. 10-2021-0088011 and its English translation provided by Applicant's foreign counsel.

*Primary Examiner* — Peter M Bythrow
(74) *Attorney, Agent, or Firm* — WOMBLE BOND DICKINSON (US) LLP

(57) ABSTRACT

One embodiment of the present disclosure relates to a vehicle radar apparatus and a method of controlling the same. The radar apparatus according to the present embodiment may include an antenna unit including Nt transmitting antennas and Nr receiving antennas, wherein one of the Nt transmitting antennas is vertically offset from the other transmitting antennas, or one of the Nr receiving antennas is vertically offset from the other receiving antennas, a transceiver configured to control the Nt transmitting antennas to transmit a phase shift transmission signal having N different phase shift values ($a_n$) and control the Nr receiving antennas to receive a reflected signal reflected from a target, and a signal processor configured to determine a height (h) of the target based on a discrete phase shift value ($a_{max}$) that is a phase shift value having the greatest reception power among N phase shift values.

20 Claims, 13 Drawing Sheets

(a)

(b)

(56) References Cited

U.S. PATENT DOCUMENTS

| | | | | |
|---|---|---|---|---|
| 6,587,072 B1* | 7/2003 | Gresham | ................ | G01S 13/106 342/25 R |
| 9,046,607 B2* | 6/2015 | Ohkado | ................ | G01S 13/42 |
| 9,575,167 B2* | 2/2017 | Asanuma | ................ | G01S 13/06 |
| 9,575,170 B2* | 2/2017 | Kurono | ................ | G01S 13/42 |
| 10,048,366 B1* | 8/2018 | Hong | ................ | G01S 13/723 |
| 10,359,512 B1* | 7/2019 | Hong | ................ | G01S 13/878 |
| 11,454,705 B2* | 9/2022 | Mardani | ................ | G01S 7/415 |
| 11,796,662 B2* | 10/2023 | Lee | ................ | G01S 7/41 |
| 2007/0273576 A1* | 11/2007 | Struckman | ................ | G01S 3/146 342/146 |
| 2009/0315755 A1* | 12/2009 | Cornic | ................ | G01S 13/913 342/38 |
| 2010/0271254 A1* | 10/2010 | Kanamoto | ................ | G01S 13/931 342/146 |
| 2011/0221628 A1* | 9/2011 | Kamo | ................ | G01S 7/295 342/123 |
| 2012/0001791 A1* | 1/2012 | Wintermantel | ................ | G01S 7/0233 342/109 |
| 2012/0119937 A1* | 5/2012 | Yamada | ................ | G01S 7/4021 342/70 |
| 2013/0038484 A1* | 2/2013 | Ohkado | ................ | G01S 13/46 342/70 |
| 2014/0062762 A1* | 3/2014 | Kurono | ................ | G01S 7/354 342/146 |
| 2014/0292559 A1* | 10/2014 | Asanuma | ................ | G01S 13/345 342/133 |
| 2016/0209504 A1* | 7/2016 | Steinhauer | ................ | G01S 3/44 |
| 2017/0029107 A1* | 2/2017 | Emami | ................ | G01S 13/825 |
| 2017/0082730 A1* | 3/2017 | Kishigami | ................ | H01Q 21/061 |
| 2017/0212213 A1* | 7/2017 | Kishigami | ................ | G01S 13/284 |
| 2018/0024235 A1* | 1/2018 | Hong | ................ | G01S 13/87 342/59 |
| 2018/0088224 A1* | 3/2018 | Kishigami | ................ | G01S 13/46 |
| 2018/0151961 A1* | 5/2018 | Lim | ................ | H01Q 21/065 |
| 2019/0265347 A1* | 8/2019 | Wintermantel | ................ | H01Q 1/3283 |
| 2019/0310358 A1* | 10/2019 | Lee | ................ | G01S 13/931 |
| 2019/0310359 A1* | 10/2019 | Lee | ................ | G01S 13/0218 |
| 2019/0324133 A1* | 10/2019 | Hong | ................ | G01S 13/42 |
| 2019/0391230 A1* | 12/2019 | Loesch | ................ | G01S 13/42 |
| 2020/0225337 A1* | 7/2020 | Kishigami | ................ | G01S 7/41 |
| 2022/0099795 A1* | 3/2022 | Crouch | ................ | G01S 13/003 |
| 2022/0099818 A1* | 3/2022 | Werner | ................ | G01S 5/0252 |
| 2022/0120849 A1* | 4/2022 | Kishigami | ................ | G01S 7/032 |
| 2022/0163623 A1* | 5/2022 | Kishigami | ................ | G01S 13/42 |
| 2022/0236407 A1* | 7/2022 | Lim | ................ | H01Q 1/24 |

\* cited by examiner (a)

(b)

(a)

(b)

(c)

N = 4 / Sequence $$a_n = \frac{360 \cdot n}{N}$$

VEHICLE RADAR APPARATUS AND METHOD OF CONTROLLING THE SAME

CROSS REFERENCE TO RELATED APPLICATION

This application claims priority from Korean Patent Application No. 10-2021-0088011, filed on Jul. 5, 2021, which is hereby incorporated by reference for all purposes as if fully set forth herein.

BACKGROUND OF THE INVENTION

1. Field of the Invention

One embodiment of the present disclosure relates to a vehicle radar apparatus and a method of controlling the same, and more particularly, to a radar apparatus and method for detecting height information of a target using a vertically offset multi-input-multi-output (MIMO) antenna and a phase shift transmission signal.

2. Description of the Prior Art

Recently, a driver assistance system (DAS) or an advanced driver assistance system (ADAS) is widely used, and for that, it is necessary to acquire accurate target information.

In order to implement such a DAS or ADAS function, a plurality of vehicle sensors are used, and a vehicle radar apparatus is one of the vehicle sensors.

Meanwhile, among the vehicle sensors, a camera sensor has an advantage in that the camera sensor can acquire accurate target information but has a disadvantage in that the use of the camera sensor is limited at night or in a climatic environment such as fog.

However, a vehicle radar sensor is widely used as a vehicle sensor in that the radar sensor is relatively free from restriction due to nighttime or a climatic environment.

A radar apparatus mounted on a vehicle or the like transmits a radar signal, which is an electromagnetic wave having a certain frequency, receives a signal reflected from an object, and then processes the received signal, thereby performing a function of extracting position or velocity information of the object.

A vehicle radar includes one or more transmitting antennas and one or more receiving antennas and acquires target information such as lateral direction information (azimuth angle) and a distance of a target from a composite signal of a transmission signal and a reception signal reflected from the target.

In general, in the case of a vehicle radar, there is a disadvantage in that vertical information such as a height and an elevation angle of a target cannot be accurately detected compared with a camera sensor or a light detection and ranging (LiDAR) sensor.

In particular, since height information of a target is important information when the driving of an own vehicle is controlled, there is a need to accurately detect the height information of the target through a radar apparatus.

SUMMARY OF THE INVENTION

An aspect of the present disclosure is to provide a method of improving the target height detecting performance of a vehicle radar.

Another aspect of the present disclosure is to provide a vehicle radar apparatus and method capable of acquiring height information of a target using a multi-input-multi-output (MIMO) antenna and a transmission signal having a plurality of phase shift values.

In an aspect, embodiments of the present disclosure may provide a radar apparatus including an antenna unit which includes Nt transmitting antennas and Nr receiving antennas, wherein one of the Nt transmitting antennas is vertically offset from the other transmitting antennas, or one of the Nr receiving antennas is vertically offset from the other receiving antennas, and Nt and Nr are natural numbers that are greater than or equal to 2, a transceiver configured to control the Nt transmitting antennas to transmit a phase shift transmission signal having N different phase shift values ($a_n$) and control the Nr receiving antennas to receive a reflected signal reflected from a target, and a signal processor configured to determine a height (h) of the target based on a discrete phase shift value ($a_{max}$) that is a phase shift value having the greatest reception power among N phase shift values.

In another aspect, embodiments of the present disclosure may provide a method of controlling a radar apparatus, the method including transmitting a phase shift transmission signal having N different phase shift values through Nt transmitting antennas, wherein Nt is a natural number that is greater than or equal to 2, receiving a reflected signal reflected from a target through Nr receiving antennas, wherein Nr is a natural number that is greater than or equal to 2, and determining a discrete phase shift value ($a_{max}$) which is a phase shift value having the greatest reception power among the N phase shift values and determining a height (h) of the target based on the determined discrete phase shift value ($a_{max}$).

The transceiver of the radar apparatus may divide the transmission signal having the N phase shift values by time index or sequence to transmit the phase shift transmission signal.

The N phase shift values of the phase shift transmission signal may be 0°, (360/N)°, ((360×2)/N)°, . . . , and ((360×(N−1))/N)°.

The transceiver may transmit the phase shift transmission signal through beamforming centered at an azimuth angle of 0°.

The signal processor may determine a maximum phase shift value (â) using the discrete phase shift value ($a_{max}$) and may determine the height (h) of the target based on the maximum phase shift value.

The signal processor may determine an elevation angle ($\theta_{ele}$) of the target based on the maximum phase shift value (â) and may determine the height (h) of the target based on a distance (R) to the target and the elevation angle ($\theta_{ele}$) of the target.

Nt may be 2, and the phase shift transmission signal may include a plurality of fast chirp signals.

When the time index is n, the phase shift transmission signal generated for each time index may include a signal in which two fast chirp signals having phases of 0°+((360×n)/N)° and 180°+((360×n)/N)° are repeated, wherein n=0, 1, 2, . . . , and (N−1).

The phase shift transmission signal generated for each sequence may include 2×N fast chirp signals having phases of 0°, 0°+((360)/N)°, 0°+((360×2)/N)°, . . . , and 0°+((360×(N−1))/N)°, and 180°, 180°+((360)/N)°, 180°+((360×2)/N)°, . . . , and 180°+((360×(N−1))/N)°.

As will be described below, according to embodiments of the present specification, it is possible to improve the target height detecting performance of a vehicle radar.

In addition, according to embodiments of the present specification, height information of a target can be accurately detected using a MIMO antenna and a transmission signal having a plurality of phase shift values.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
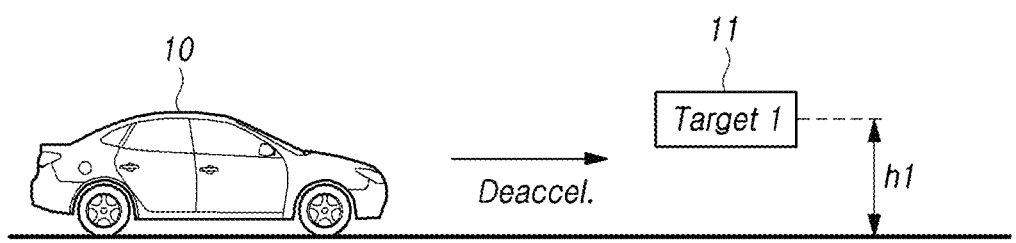
FIG. 1 illustrates an example of general vehicle control according to a height of a target.
Figure 1:
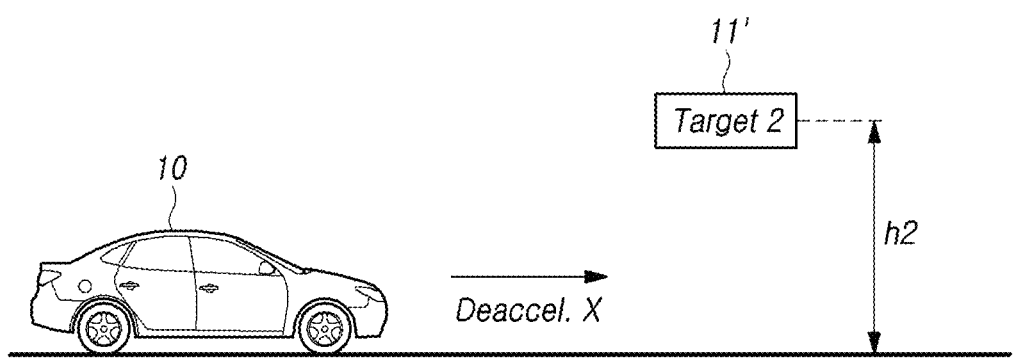

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", WA", "B", "(A)", or "(B)" may be used herein to describe elements of the disclosure. Each of these terms is not used to define essence, order, sequence, or number of elements etc., but is used merely to distinguish the corresponding element from other elements. When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

FIG. 1 illustrates an example of general vehicle control according to a height of a target.

In a vehicle in which a radar apparatus is used, various types of driver assistance systems (DASs) or advanced driver assistance systems (ADASs) are used to assist a driver in driving.

Among the various types, in an adaptive cruise system (ACC) which follows a vehicle in front, it is necessary to detect a target at a mid/long distance in front of a vehicle in a driving direction.

Meanwhile, an autonomous emergency braking system (AEB) or autonomous emergency steering system (AES) which urgently brakes a vehicle or performs steering avoidance in the presence of an obstacle in front, or a lane changing assistance (LCA) system which prevents collisions with obstacles in adjacent lanes when changing lanes, it is necessary to detect an obstacle at a short distance in the vicinity of a vehicle with high precision.

A vehicle radar apparatus should measure target information such as distance information, velocity information, and angle information of a plurality of targets in a wide distance range with high precision.

In particular, in performing a function of a DAS or ADAS in which vehicle velocity control is required, a height of an obstacle positioned in front of a vehicle may be important.

As shown in FIG. 1A, there is a first target with a height h1 in front of an own vehicle 10 being driven, and when the height h1 of the first target is less than a height of the vehicle, since there is a possibility of a collision with the target, collision avoidance control for decelerating the vehicle is required.

On the other hand, FIG. 1B shows a case in which there is a second target 11' with a height h2 in front of the own vehicle 10 being driven, and the height h2 of the second target is significantly greater than the height of the vehicle.

Such a second target may be a superstructure such as a tunnel, an overpass, or an pedestrian overpass, and since the second target 11' does not affect vehicle driving, it is unnecessary to control a velocity or the like of the own vehicle 10.

As described above, since vehicle control may depend on a height of a target in front, it is necessary to accurately detect height information of the target in front using a radar apparatus.

To this end, recently, a radar apparatus for measuring an elevation angle of a target using a plurality of antennas offset in a vertical direction y has been developed.

However, even when such a radar apparatus is used, there is a certain limit in accurately measuring vertical height information of a target.

Accordingly, the present embodiment provides a method capable of acquiring height information of a target using a vertically offset multi-input-multi-output (MIMO) antenna and a phase shift transmission signal having a plurality of phase shift values.

Figure 2:
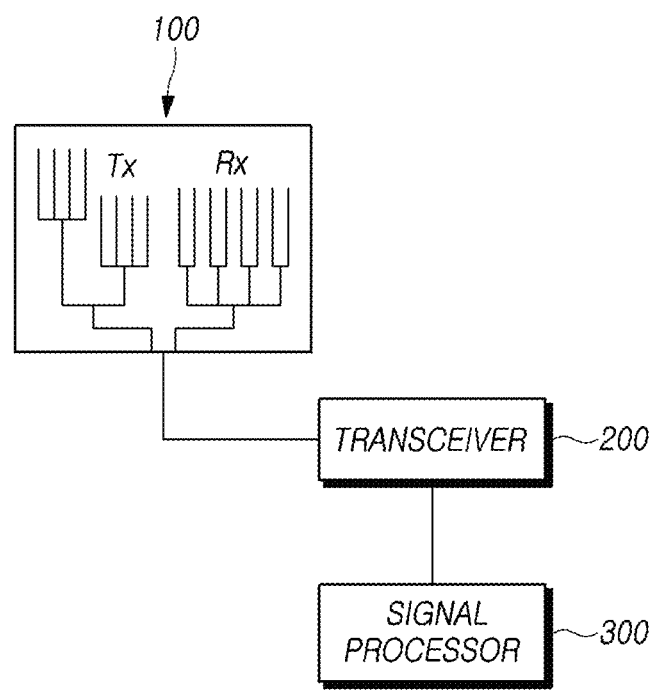
FIG. 2 schematically illustrates a configuration of a radar apparatus according to one embodiment.

FIG. 2 schematically illustrates a configuration of a radar apparatus according to one embodiment.

The radar apparatus according to the present embodiment may include an antenna unit 100, a transceiver 200, and a signal processor 300.

The antenna unit 100 may include Nt transmitting antennas Tx and Nr receiving antennas Rx (here, Nt is a natural number greater than or equal to or 2 and Nr is a natural number greater than or equal to 2).

One of the Nt transmitting antennas may be offset from the other transmitting antennas in a vertical direction y, or one of the Nr receiving antennas may be vertically offset from the other receiving antennas in the vertical direction.

That is, in the antenna unit 100 of the radar apparatus according to the present embodiment, one of the plurality of transmitting antennas may be spaced apart from the other transmitting antennas by a certain offset distance ΔO in the vertical direction perpendicular to a ground surface. Alternatively, one of the plurality of receiving antennas may be spaced apart from the other receiving antennas by a certain offset distance ΔO in the vertical direction perpendicular to the ground surface.

A signal transmitted or received from the transmitting antenna or receiving antenna offset in the vertical direction has a certain phase difference from a signal transmitted or received from the other transmitting or receiving antennas, and vertical direction information of a target may be detected based on the phase difference.

A vertical offset configuration of the antenna unit according to the present embodiment will be described in more detail below with reference to FIGS. 6 and 7.

The transceiver 200 of the radar apparatus according to the present embodiment may transmit a phase shift transmission signal having N different phase shift values through the Nt transmitting antennas.

In the present specification, the N phase shift values are denoted by $a_n$, and n is an integer of 0, 1, . . . , or N−1. n may be expressed as an index or a time index.

In addition, the transceiver 200 may receive a reflected signal reflected from a target through the Nr receiving antennas.

In this case, Nt and Nr may be natural numbers that are greater than or equal to 2. As an example, Nt may be 2 and Nr may be 4, but the present disclosure is not limited thereto.

The transceiver 200 may divide the phase shift transmission signal having the N phase shift values by time index or sequence to transmit the phase shift transmission signal.

In this case, the N phase shift values $a_n$ of the phase shift transmission signal may be 0°, (360/N) °, ((360×2)/N)°, . . . , and ((360×(N−1))/N)°.

In addition, the phase shift transmission signal may include a plurality of fast chirp signals.

As an example, when Nt is 2, the phase shift transmission signal may include a signal in which two fast chirp signals having phases of 0°+((360×n)/N)° and 180°+((360×n)/N)° are repeated when the time index is n (n=0, 1, 2, . . . , and (N−1)).

As another example, when Nt is 2, the phase shift transmission signal may include 2×N fast chirp signals having phases of 0°+((360)/N)°, 0°+((360×2)/N)°, . . . , and 0°+((360×(N−1))/N)°, and 180°, 180°+((360)/N)°, 180°+((360×2)/N)°, . . . , and 180°+((360×(N−1))/N)°.

A detailed configuration of the phase shift transmission signal transmitted by the transceiver 200 will be described in more detail below with reference to FIGS. 8 and 9.

In addition, the transceiver 200 may transmit the phase shift transmission signal through beamforming centered at an azimuth angle of 0°.

In order to accurately measure height information of an object in front, the radar apparatus according to the present embodiment may transmit a beam of the phase shift transmission signal having the N phase shift values to the center in front.

Specifically, the radar apparatus according to the present embodiment may beamform a transmission signal using the Nt transmitting antennas. In this case, the beamforming may be performed such that a horizontal azimuth angle of a beam of the transmission signal in a central direction becomes an angle of 0°.

As will be described below, the height information of a target is determined based on a distance to the target and an elevation angle. Therefore, an accurate height of a target can be measured only by using a distance to the target in a front direction from a vehicle center.

Accordingly, in the present embodiment, the measurement accuracy of a height of a target can be improved by transmitting a beam of a transmission signal such that the beam is transmitted in a central direction thereof which is a direction in which a horizontal azimuth angle is 0°.

The transceiver 200 of the radar apparatus according to the present embodiment may further include a transmitter and a receiver. The transmitter includes an oscillation part which generates a transmission signal by supplying a signal to each transmitting antenna. Such an oscillation part may include, for example, a voltage-controlled oscillator (VCO), an oscillator, and the like.

The receiver included in the transceiver 200 may include a low noise amplifier (LNA) which low-noise-amplifies a reflected signal received through the receiving antenna, a mixer which mixes the low-noise-amplified received signal, an amplifier which amplifies the mixed received signal, and a converter (analog-to-digital converter (ADC)) which digitally converts the amplified received signal to generate reception data.

Meanwhile, the signal processor 300 of the radar apparatus according to the present embodiment may determine a discrete phase shift value $a_{max}$ which is a phase shift value having the greatest reception power among the N phase shift values.

In addition, the signal processor 300 may determine a height h of a target based on the determined discrete phase shift value $a_{max}$.

Specifically, the signal processor 300 may determine a maximum phase shift value â using the discrete phase shift value $a_{max}$ and may determine the height h of the target based on the maximum phase shift value.

More specifically, the signal processor 300 may determine an elevation angle $\theta_{ele}$ of the target based on the maximum phase shift value â and may determine the height h of the target based on a distance R to the target and the elevation angle $\theta_{ele}$ of the target.

In this case, the signal processor 300 may estimate the maximum phase shift value â using left and right index values of the determined discrete phase shift value $a_{max}$ To this end, a spline interpolation method or a 3-point estimation method may be used.

The signal processor 300 may determine the discrete phase shift value $a_{max}$ using Equation 1 below.

$$a_{max} = \text{argmax } P(a_n) \quad \text{[Equation 1]}$$

In Equation 1, $P(a_n)$ denotes the power of a phase shift transmission signal having each phase shift value. That is, according to Equation 1, the discrete phase shift value $a_{max}$ is a phase shift value that maximizes the power of the phase shift transmission signal.

In addition, the signal processor 300 may estimate the elevation angle $\theta_{ele}$ of the target and the height h of the target using Equations 2 and 3 below, respectively.

$$\theta_{ele} = \sin^{-1}(-\hat{a}/2\pi) \quad \text{[Equation 2]}$$

$$h = R \cdot \sin \theta_{ele} \quad \text{[Equation 3]}$$

In Equations above, a denotes a phase shift value of the phase shift transmission signal which generates maximum reception power.

In particular, according to the present embodiment, since the N phase shift values $a_n$ are already known to the signal processor 300, the N phase shift values may be removed through phase correction in a subsequent processing process after a first Fourier transform of a reception signal. Therefore, even when the N phase shift values are added, it does not interfere with obtaining a horizontal direction such as an azimuth angle.

A detailed configuration for estimating the height h of the target in the signal processor 300 according to the present embodiment will be described in more detail below with reference to FIG. 10.

Meanwhile, the signal processor 300 of the radar apparatus according to the present embodiment may include a first processor and a second processor for signal processing. The first processor is a pre-processor for the second processor. The first processor may acquire transmission data and reception data, may control the oscillation part to generate a transmission signal based on the acquired transmission data, may synchronize the transmission data and the reception data, and may perform frequency conversion on the transmission data and the reception data.

The second processor may be a post-processor which performs actual processing using a processing result of the first processor and may perform a constant false alarm rate (CFAR) operation, a tracking operation, a target selection operation, and the like based on the reception data subjected to the frequency conversion by the first processor. In addition, the second processor may determine height information of a target through such a method.

The first processor may perform frequency conversion after data-buffering acquired transmission data and acquired reception data in a unit sample size that is processable per cycle. The frequency conversion performed by the above-described first processor may be implemented using a Fourier transform such as a fast Fourier transform (FFT).

The second processor may perform a second Fourier transform on a signal subjected to the first Fourier transform (FFT) by the first processor, and the second Fourier transform may be, for example, a discrete Fourier transform (DFT) (hereinafter, referred to as "DFT"). In addition, among DFTs, the second Fourier transform may be a chirp-discrete Fourier transform (chirp-DFT).

The second processor obtains as many frequency values as a number corresponding to a second Fourier transform length K through the second Fourier transform such as a chirp-DFT, determines a bit frequency having the greatest power for each chirp period based on the obtained frequency values, and acquires velocity information and distance information of an object based on the determined bit frequency, thereby detecting the object.

The signal processor 300 may be expressed in another term such as a controller and may be implemented in the form of a digital signal processor (DSP).

Meanwhile, a radar sensor apparatus may be classified into a pulse type, a frequency modulation continuous wave (FMCW) type, a frequency shift keying (FSK) type, and the like according to a used signal type.

Among them, an FMCW type radar apparatus may use a chirp signal or a ramp signal, which is a signal whose frequency increases over time, and may determine information of an object using a time difference between a transmission wave and a reception wave and a Doppler frequency shift.

Hereinafter, a pulse type or FMCW type radar apparatus using a fast chirp signal will be described, but the preset disclosure is not limited thereto.

According to the present embodiment as described above, it is possible to determine accurate height information of a target in front of a vehicle using a transmission signal having N phase shift values and a transmitting antenna offset in a vertical direction.

For example, it is possible to accurately identify a superstructure such as a tunnel, a pier, or a pedestrian overpass positioned in front of a vehicle. In this case, vehicle deceleration control may not be performed.

In conclusion, by appropriately controlling a vehicle according to height information of an obstacle in front of the vehicle, precise vehicle driving control in autonomous driving or the like is possible.

Figure 3:
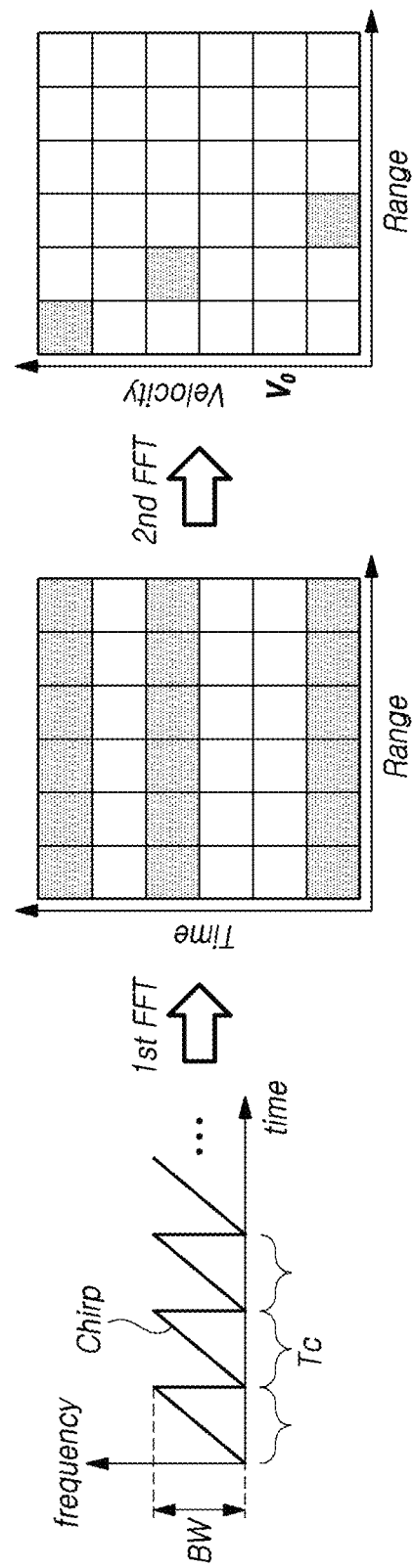
FIG. 3 illustrates a principle in which a radar apparatus acquires range-velocity information of a target according to the present embodiment.

FIG. 3 illustrates a principle in which a radar apparatus acquires range-velocity information of a target according to the present embodiment.

Referring to FIG. 3, in the radar apparatus according to the present embodiment, a first Fourier transform 1st FFT may be performed on a fast time of a reception signal to obtain a time component according to a range, and a second Fourier transform 2nd FFT may be performed on a slow time thereof to compress a signal present at each range according to a velocity, thereby determining range-velocity information of a target.

More specifically, as shown at the left side of FIG. 3, a signal processor 300 performs the first Fourier transform 1st FFT, which is an FFT, on a radar reception signal including a fast ramp or a fast chirp, thereby determining a range-time graph which corresponds to a time component according to a range.

Next, the signal processor 300 may perform the second Fourier transform, which is a secondary Fourier transform, on a range-to-time component to determine range-velocity domain information indicating velocity information according to a range as shown at the right side of FIG. 3. The range-velocity domain information may be expressed on a range-Doppler map.

For example, as shown in FIG. 3, when a two-dimensional (2D) Fourier transform (FFT) is performed on a composite signal of the reception signal and a transmission signal, three grid regions may be displayed as targets on the range-Doppler map.

Figure 4:
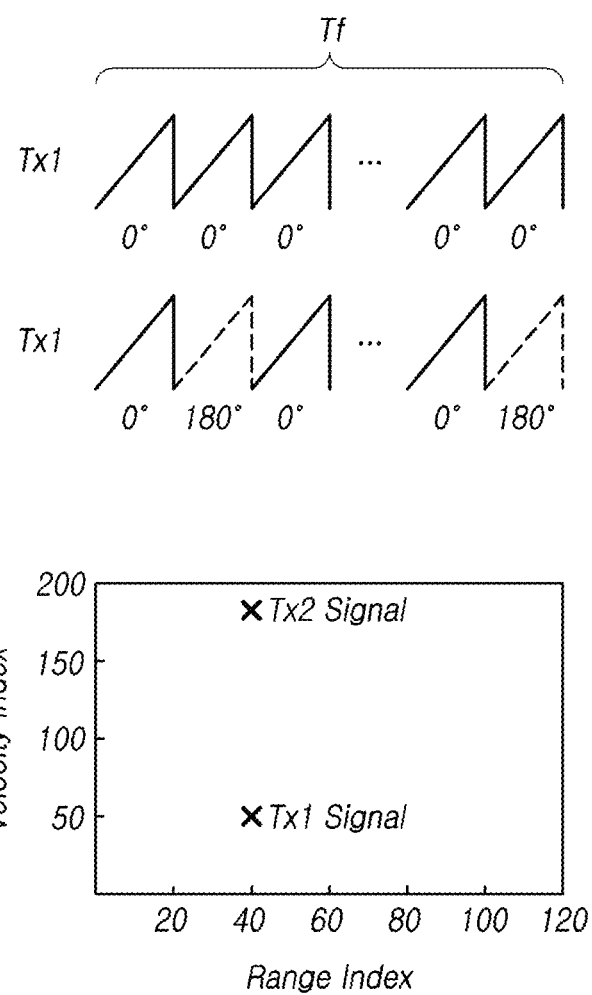
FIG. 4 illustrates a signal waveform through binary phase modulation (BPM) usable in a radar apparatus according to the present embodiment and mapping on a range-velocity map according thereto.

FIG. 4 illustrates a signal waveform through binary phase modulation (BPM) usable in a radar apparatus according to the present embodiment and mapping on a range-velocity map according thereto.

When the above-described fast chirp signal is used, a code having orthogonality may be applied to each chirp ramp signal to divide signals. In addition, when a MIMO antenna is used, beamforming may be performed by applying a code to a signal transmitted/received by each antenna.

Methods of dividing signals using a code having orthogonality include BWM, code division multiplexing, and the like.

FIG. 4 illustrates the signal waveform through the BPM among the methods and the mapping on the range-velocity map according thereto.

FIG. 4 illustrates a case in which the radar apparatus includes two transmitting antennas Tx1 and Tx2, and the respective transmitting antennas transmit different phase shift signals.

Specifically, a first transmitting antenna Tx1 transmits a first transmission signal having a plurality of chirps with a phase of 0°. A second transmitting antenna Tx2 transmits a second transmission signal in which a first chirp (indicated by a solid line) having a phase of 0° and a second chirp (indicated by a dotted line) having a phase of 180° as an inverted phase are alternately disposed.

In this case, when a composite signal of a reception signal and a transmission signal is mapped on the range-velocity map, as shown in the lower graph of FIG. 4, the first transmission signal and the second transmission signal are divided.

Accordingly, range-velocity information of a target may be accurately measured using the first transmission signal and the second transmission signal.

In addition, when BPM is used, a receiving array including a plurality of virtual receiving antennas (virtual antennas Rx) may be generated.

By using the receiving array including such virtual receiving antennas, angular resolution with respect to a target can be improved, which will be described in more detail with reference to FIGS. 6 and 7.

Figure 5:
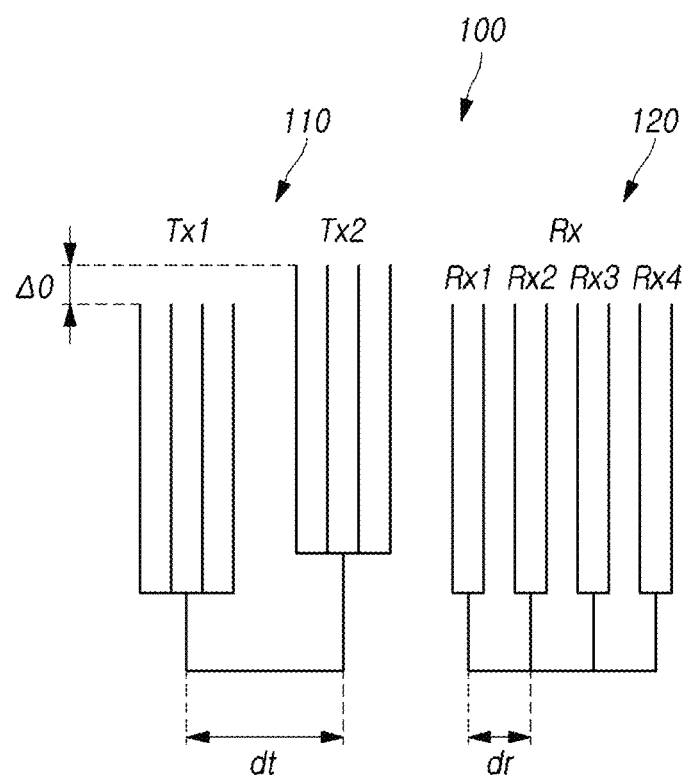
FIG. 5 illustrates an example of an antenna unit of a radar apparatus according to the present embodiment.

FIG. 5 illustrates an example of an antenna unit of a radar apparatus according to the present embodiment. FIG. 6 illustrates examples of a vertical offset structure of a transmitting antenna and the formation of a receiving antenna array according thereto. FIG. 7 illustrates examples of a vertical offset structure of a receiving antenna and the formation of a receiving antenna array according thereto.

As shown in FIG. 5, an antenna unit 100 of the radar apparatus according to the present embodiment may include a transmitting antenna unit 110 including Nt transmitting antennas and a receiving antenna unit 120 including Nr receiving antennas.

In FIG. 5, an example of a case in which Nt is 2 and Nr is 4 will be described.

According to the embodiment of FIG. 5, the antenna unit 100 may include two transmitting antennas Tx1 and Tx2 and four receiving antennas Rx. The two transmitting antennas Tx1 and Tx2 may be spaced apart from each other by a certain offset distance ΔO in a vertical direction, and the plurality of receiving antennas Rx may all have the same vertical position.

Figure 7:
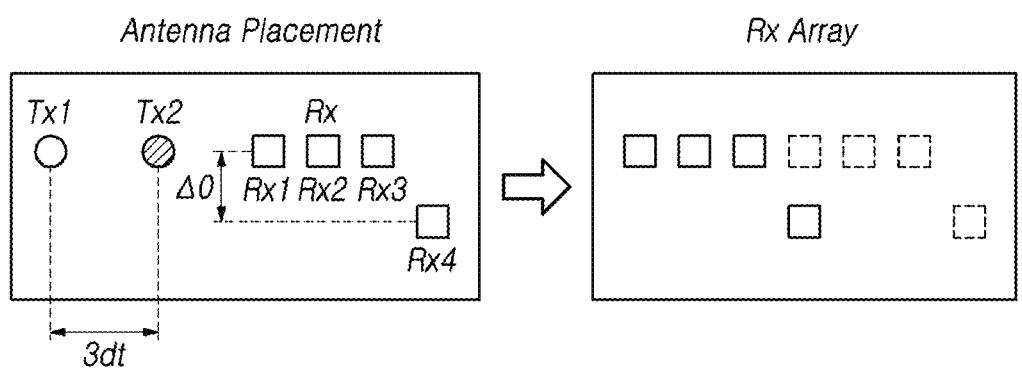
FIG. 7 illustrates examples of a vertical offset structure of a receiving antenna and the formation of a receiving antenna array according thereto.

Of course, as shown in FIG. 7, one of the receiving antennas may be offset in the vertical direction.

Each of the transmitting antenna and the receiving antenna may have a structure in which two, four, or six array antennas have one feed point and extend to one side, but the present disclosure is not limited thereto.

Each array antenna constituting the transmitting antenna and the receiving antenna may include a plurality of elements or patches connected to an output line of a divider and may extend in an upper direction (upper direction of a vertical direction) from a starting point such as a feed port connected to a chip including a controller or an input port of the divider.

In addition, the two transmitting antennas Tx1 and Tx2 constituting the transmitting antenna unit may be spaced apart from each other by a horizontal distance dt in a horizontal direction perpendicular to an extending direction of each array antenna. In this case, the horizontal distance dt may be a distance (0.5λ) of ½ of a wavelength of a transmission signal.

In this case, four receiving antennas Rx1 to Rx4 constituting the receiving antenna unit may also be disposed apart from each other by a horizontal distance dr in the horizontal direction.

In this case, the horizontal distances dt and dr are set to the distance (0.5λ) of ½ of the wavelength of the transmission signal so that there is an effect of removing angle ambiguity caused by a grating lobe.

That is, since a distance between the receiving antennas is greater than or equal to the distance (0.5λ) of ½ of the wavelength of the transmission signal, a grating lobe may occur. The horizontal distance between the receiving antennas is set to 0.5λ, and pieces of angle information extracted from channels of the receiving antennas are compared and compensated for, thereby minimizing the angle ambiguity of angle measurement caused by the grating lobe.

In addition, as shown in FIG. 5, since the two transmitting antennas Tx1 and Tx2 are offset by the certain offset distance ΔO in the vertical direction, a first reception signal transmitted from the transmitting antenna Tx1 and received by the receiving antenna and a second reception signal transmitted from the transmitting antenna Tx2 and received by the receiving antenna may have a phase difference according to a vertical offset.

In addition, a first transmission signal and a second transmission signal having orthogonality to each other may be simultaneously transmitted through the first transmitting antenna TX1 and the second transmitting antenna TX2.

Therefore, a target distance to a target may be determined using a time difference between a transmission time and a reception time, and horizontal information or vertical information of the target may be determined using a phase difference between the first and second transmission signals and the first and second reception signals.

In the radar apparatus according to the present embodiment, radar signals transmitted or received from the transmitting antenna or receiving antenna offset in the horizontal direction may be modulated and used through different modulation methods.

Meanwhile, in the radar apparatus according to the present embodiment, due to a virtual receiving antenna-forming unit, a receiving end may have a receiving array structure in which a plurality of receiving antennas are actually present, and also, a plurality of virtual receiving antennas are virtually present.

As described above, an antenna structure in which a plurality of virtual receiving antennas are further virtually present at the receiving end may be expressed as an "antenna structure having a virtual aperture structure."

For example, in an antenna structure of FIG. 5, during a certain detection period (frame or the like), the first transmission signal and the second transmission signal having orthogonality to each other are simultaneously transmitted through the first transmitting antenna TX1 and the second transmitting antenna TX2.

Meanwhile, since the first transmitting antenna TX1 and the second transmitting antenna TX2, which respectively transmit the first transmission signal and the second transmission signal, are spaced apart from each other by the horizontal distance dt in the horizontal direction and the offset distance ΔO in the vertical direction, the receiving antenna receiving a reflected signal reflected from an object has the same effect as that when reflected signals of the first transmission signal and the second transmission signal are received by being shifted by the horizontal distance dt in the horizontal direction and the offset distance ΔO in the vertical direction.

In this case, as a concept distinguishable from an actual receiving antenna, a receiving antenna, which is virtually present due to horizontal and vertical separation between transmitting antennas which simultaneously transmit signals, may be expressed as a virtual receiving antenna.

Figure 6:
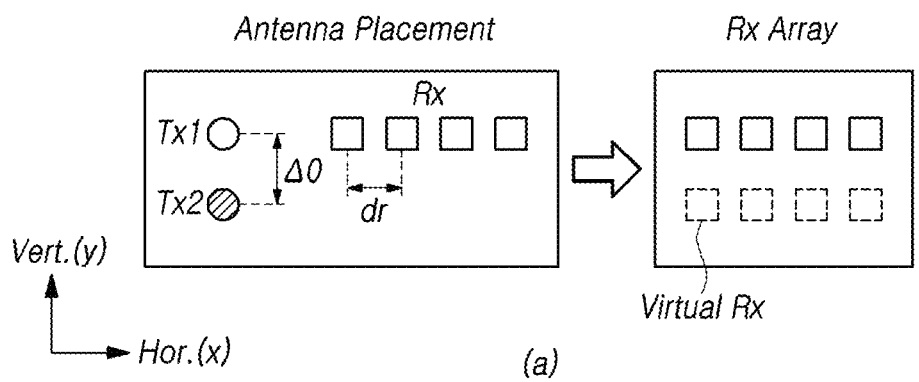
FIG. 6 illustrates examples of a vertical offset structure of a transmitting antenna and the formation of a receiving antenna array according thereto.
Figure 6:
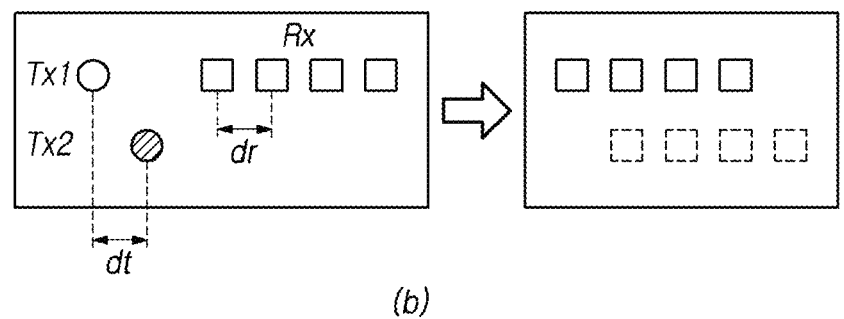
Figure 6:
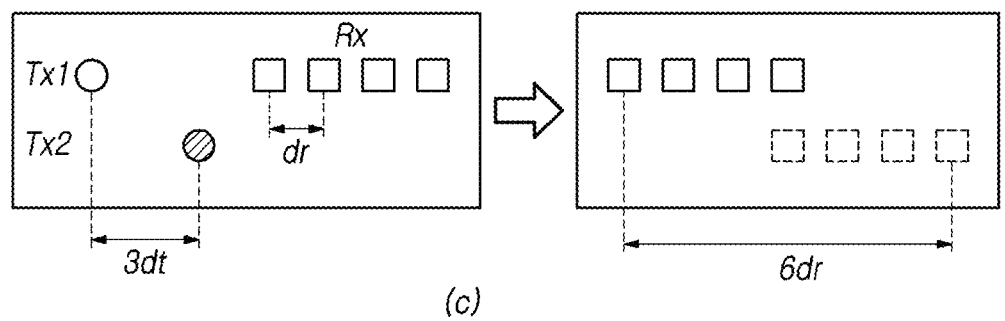

In FIGS. 6 and 7, a transmitting antenna is indicated by a circle, and a receiving antenna is indicated by a quadrangle. In addition, an actual antenna is indicated by a solid line, and a virtual receiving antenna is indicated by a dotted line.

For example, as shown in an antenna placement diagram at the left side of FIG. 6A, two transmitting antennas Tx1 and Tx2 have the same horizontal direction (x-direction) position and are disposed apart from each other by an offset distance ΔO in a vertical direction (y-direction). In addition, four receiving antennas have the same vertical position as the transmitting antenna Tx1 and are disposed apart from each other by a horizontal distance dr.

In this case, as shown at the right side of FIG. 6A, four actual receiving antennas and four virtual receiving antennas are formed at a receiving end. The four virtual receiving antennas have the same horizontal position as the four actual receiving antennas and are spaced apart from the four actual receiving antennas by the offset distance ΔO in the vertical direction.

In an embodiment of FIG. 6B, two transmitting antennas Tx1 and Tx2 are disposed apart from each other by a horizontal distance dt in a horizontal direction and an offset distance ΔO in a vertical direction. In addition, four receiving antennas have the same vertical position as the transmitting antenna Tx1 and are disposed apart from each other by a horizontal distance dr.

In this case, four virtual receiving antennas formed at a receiving end are formed to be offset from the four actual receiving antennas by the horizontal distance dt in the horizontal direction and the offset distance ΔO in the vertical direction.

In an embodiment of FIG. 6C, two transmitting antennas Tx1 and Tx2 are disposed apart from each other by a horizontal distance 3dt in a horizontal direction and an offset distance ΔO in a vertical direction. In addition, four receiving antennas have the same vertical position as the transmitting antenna Tx1 and are disposed apart from each other by a horizontal distance dr.

In this case, four virtual receiving antennas formed at a receiving end are formed to be offset from the four actual receiving antennas by the horizontal distance 3dt in the horizontal direction and the offset distance ΔO in the vertical direction.

As in three embodiments of FIG. 6, a radar apparatus according to the present embodiment includes the plurality of transmitting antennas and the plurality of receiving antennas, and one of the plurality of transmitting antennas is disposed apart from the other thereof by the offset distance in the vertical direction. In addition, different transmission signals having orthogonality are transmitted from the transmitting antennas.

Accordingly, a composite signal of a reception signal and a transmission signal reflected from a target may be divided in the vertical direction, and thus vertical information of the target may be determined.

In addition, an aperture of the receiving antenna is expanded by the plurality of virtual receiving antennas formed at a receiving side, thereby improving resolution.

A size of the aperture of the receiving antenna may be defined as a distance between the receiving antennas disposed at both ends of the receiving side.

Accordingly, compared with the basic embodiment shown in FIG. 6A, in the case of FIG. 6B, the size of the aperture of the receiving antenna is extended from a horizontal distance 3dr to a horizontal distance 4dr. In addition, in the case of FIG. 6C, the size of the aperture of the receiving antenna is further extended to a horizontal distance 6dr.

Accordingly, according to various embodiments as shown in FIG. 6, detection resolution can be improved using the expansion of the aperture through the virtual receiving antenna.

FIG. 7 illustrates an embodiment in which a receiving antenna is vertically offset instead of a transmitting antenna.

In the embodiment of FIG. 7, two transmitting antennas Tx1 and Tx2 are spaced apart from each other by a horizontal distance 3dt in a horizontal direction and are not offset in a vertical direction. On the other hand, among four receiving antennas, one receiving antenna Rx4 is spaced apart from the other three receiving antennas Rx1 to Rx3 by an offset distance ΔO in the vertical direction.

That is, the three receiving antennas Rx1 to Rx3 are disposed at the same vertical position as the two transmitting antennas, and only the receiving antenna Rx4 is disposed to be offset by the offset distance ΔO in the vertical direction. A distance between the four receiving antennas is a horizontal distance dr.

As shown at the right side of FIG. 7, at a receiving side, a receiving array having a shape similar to that of FIG. 6C is formed.

Consequently, in a transceiver 200 of the radar apparatus according to the present embodiment, (Nt−1)×Nr virtual receiving antennas may be formed.

As shown in FIGS. 6 and 7, in the radar apparatus according to the present embodiment, among MIMO antennas, a transmitting antenna or a receiving antenna is disposed to be offset in a vertical direction, and different transmission signals are used, thereby acquiring vertical direction information such as elevation angle or height information of a target.

Figure 8:
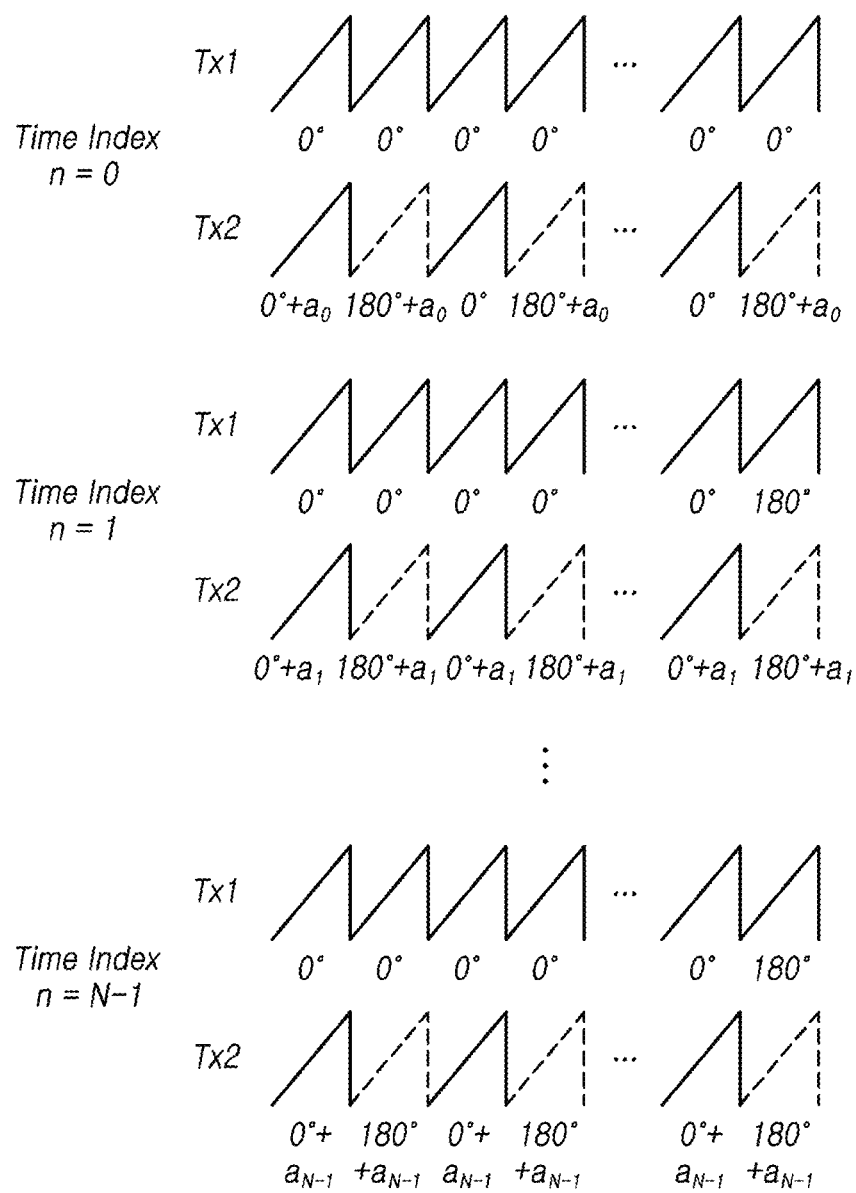
FIG. 8 illustrates an example of a phase shift transmission signal divided by time index according to the present embodiment.

FIG. 8 illustrates an example of a phase shift transmission signal divided by time index according to the present embodiment.

Figure 9:
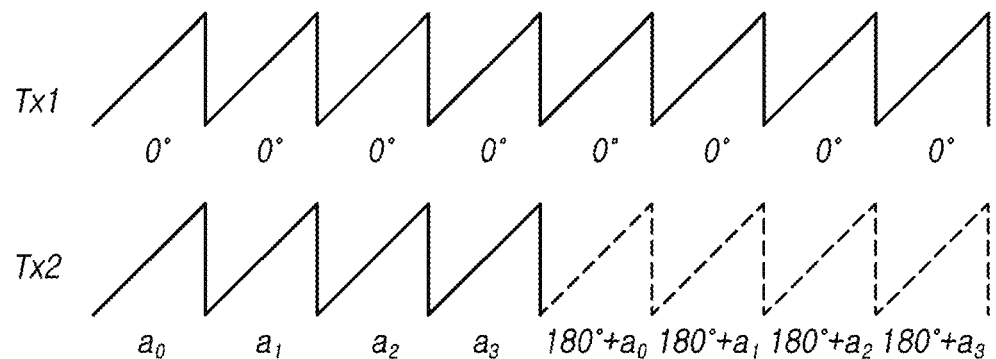
FIG. 9 illustrates an example of a phase shift transmission signal divided according to a sequence according to the present embodiment.
Figure 9:
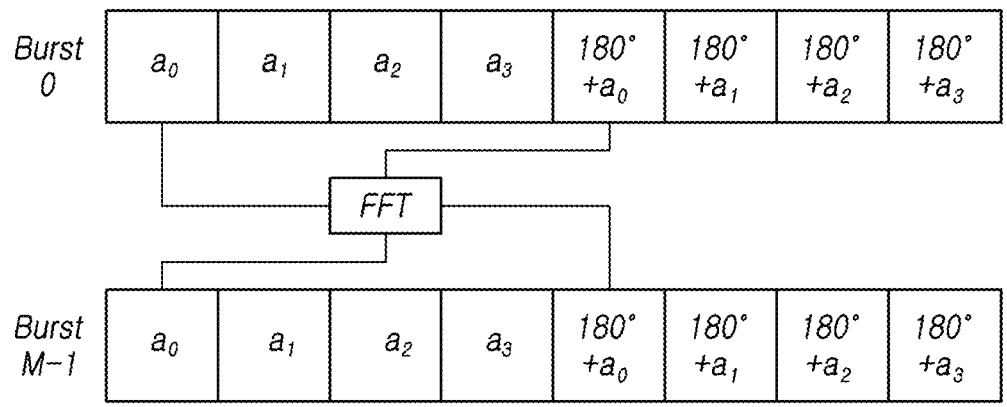

In embodiments of FIGS. 8 and 9, it is assumed that the number Nt of transmitting antennas is two. In addition, it is assumed that a transmission signal includes a plurality of fast chirp signals.

As shown in FIG. 8, in a radar apparatus according to the present embodiment, a first transmitting antenna Tx1 of two transmitting antennas transmits a first transmission signal including chirp signals with the same phase.

On the other hand, a second transmitting antenna Tx2 of the two transmitting antennas transmits a second transmission signal having a form that is different for each time. The second transmission signal is a phase shift transmission signal having N phase shift values $a_n$ according to the present embodiment.

When a time index is n (n=0, 1, 2, . . . , and (N−1)), the phase shift transmission signal may include a signal in which two fast chirp signals having phases of $0°+((360×n)/N)°$ and $180°+((360×n)/N)°$ are repeated.

Specifically, referring to FIG. 8, during a time in which the time index n is 0, the first transmission signal transmitted through the first transmitting antenna Tx1 includes only a chirp having a phase of 0°. On the other hand, the phase shift transmission signal transmitted through the second transmitting antenna Tx2 has a form in which a first chirp (solid line) having a phase of 0° and a second chirp (dotted line) having a phase of $a_0°$ are repeated. Here, $a_0$ is a phase shift value when the time index is 0 and has a value of 0.

In addition, during a subsequent time series period in which the time index n is 1, the first transmission signal is not changed, and the phase shift transmission signal, which is the second transmission signal, has a form in which a first chirp (solid line) with a phase of the phase shift value $a_1$ and a second chirp (dashed line) with a phase of $(180+a_1°)$ are repeated. Here, $a_1$ is a phase shift value when the time index is 1 and has a value of $(360/N)°$.

In the same way, during a last time series period in which the time index n is (N−1), the first transmission signal is not changed, and the phase shift transmission signal, which is the second transmission signal, has a form in which a first chirp (solid line) with a phase of a phase shift value $a_{N-1}$ and a second chirp (dashed line) with a phase of $(180+a_{N-1}°)$ are repeated. Here, $a_{N-1}$ is a phase shift value when the time index is N−1 and has a value of $(360×(N-1)/N)°$.

In the embodiment of FIG. 8, one detection period (frame) is divided into N time series, and each time series is distinguished by the time index n. The phase shift transmission signal having the N phase shift values $a_n$ according to the time series is transmitted through the second transmitting antenna Tx2.

Of course, in all time series, Nr receiving antennas may receive a reflected signal, and a power spectrum of a reception signal (or a composite signal) may be determined.

Among the N phase shift values, a phase shift value in which the power of a reception signal is the greatest may be extracted as a discrete phase shift value, and thus an accurate elevation angle of a target may be determined. This will be described in more detail below with reference to FIG. 10.

FIG. 9 illustrates an example of a phase shift transmission signal divided according to a sequence according to the present embodiment.

Referring to FIG. 9, a first transmitting antenna Tx1 of two transmitting antennas transmits a first transmission signal including chirp signals having the same phase of 0°.

On the other hand, a second transmitting antenna Tx2 of the two transmitting antennas transmits a second transmission signal having different chirp sequences. The second transmission signal is a phase shift transmission signal having N phase shift values $a_n$ according to the present embodiment.

Specifically, the phase shift transmission signal according to the embodiment of FIG. 9 may include 2×N fast chirp signals having phases of 0°, $0°+((360)/N)°$, $0°+((360×2)/N)°$, . . . , and $0°+((360×(N-1))/N)°$, and 180°, $180°+((360)/N)°$, $180°+((360×2)/N)°$, . . . , and $180°+((360×(N-1))/N)°$.

In FIG. 9, it is assumed that N is 4. The phase shift transmission signal transmitted through the second transmitting antenna Tx2 includes a total of eight chirp waveforms, and eight chirp signals sequentially have phases of $a_0°$, $a_1°$, $a_2°$, $a_3°$, $(180+a_0)°$, $(180+a_1)°$, $(180+a_2)°$, and $(180+a_3)°$.

Here, $a_0$, $a_1$, $a_2$, and $a_3$ are four phase shift values and have values of 0°, 90°, 180°, and 270°, respectively. That is, the phase shift value $a_n$ has a value of $360×n/N$.

As a result, eight chirp ramps are repeatedly disposed inside one detection period (frame), thereby forming a phase shift transmission signal.

The lower diagram of FIG. 9 illustrates a Fourier transform method in an embodiment in which a phase shift transmission signal divided by sequence is used.

When a series of repeated eight chirp waveforms is expressed as a chirp series, in a first chirp series (Burst=0) and an $M^{th}$ chirp series (Burst=M−1), an FFT may be performed on a total of four chirps including corresponding in-phase chirps $a_n$ and inverted phase chirps $180+a_n$.

Thus, a discrete phase shift value shown in FIG. 10 below can be accurately determined, and as a result, precise height information of a target can be determined.

Figure 10:
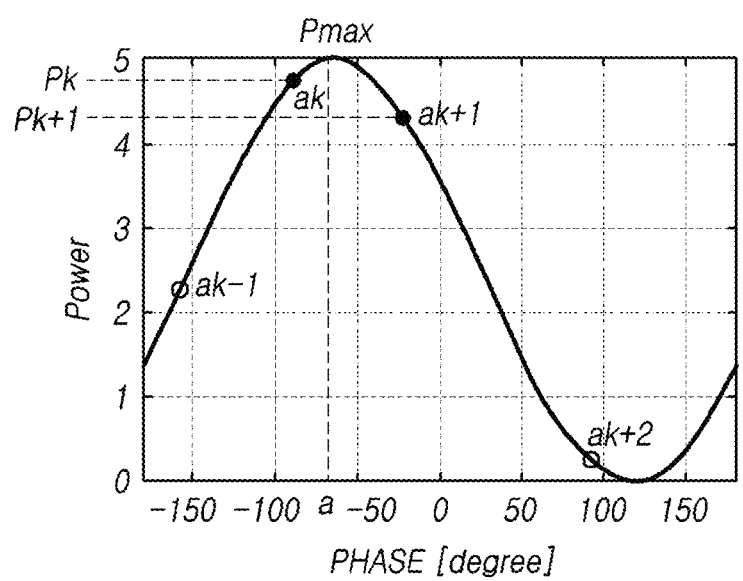
FIG. 10 shows an example of determining a discrete phase shift value and a maximum phase shift value according to the present embodiment.

FIG. 10 shows an example of determining a discrete phase shift value and a maximum phase shift value according to the present embodiment.

A graph of FIG. 10 shows the power of a reception signal (or a composite signal) when the phase shift transmission signal of FIG. 8 or 9 is used.

That is, when a phase shift transmission signal having N phase shift values is used, as shown in FIG. 10, a signal processor 300 may identify a power value of a reception signal corresponding to each phase shift value $a_n$.

Referring to FIG. 10, the signal processor 300 may analyze a power spectrum of the reception signal to determine a maximum phase shift value having the greatest power of the reception signal.

In FIG. 10, the signal processor 300 determines a discrete phase shift value $a_k$ having the greatest power value among the N phase shift values $a_n$ as a discrete phase shift value $a_{max}$.

The maximum phase shift value â may be determined using a power value corresponding to the discrete phase shift value $a_k$ and a power value corresponding to an adjacent phase shift value $a_{k+1}$.

As shown in FIG. 10, since the power value corresponding to the discrete phase shift value $a_k$ is $P_k$ and the power value corresponding to the adjacent phase shift value $a_{k+1}$ is $P_{k+1}$, the maximum phase shift value â of which a maximum power value corresponds to $P_{max}$ may be determined using an interpolation method such as a spline interpolation method or a 3-point estimation method.

When the maximum phase shift value â is determined, the signal processor 300 may determine an elevation angle $\theta_{ele}$ of a target through Equation 2 above and may determine an estimated height value h of the target through Equation 3.

As N, which is the number of phase shift values, increases, estimation performance is improved, but a transmission time, that is, a detection period (frame), may be increased.

Therefore, in the present embodiment, N, which is the number of phase shift values, may be set to an appropriate value, and in order to determine the accurate maximum phase shift value â from the discrete phase shift value $a_{max}$, an interpolation method such as a spline interpolation method or a 3-point estimation method may be used.

Of course, a structure of an antenna unit 100 of a radar apparatus according to the present embodiment is not limited to the above configuration, and other types of antennas may be used.

Such a radar sensor includes one or more transmitting antennas for transmitting a radar signal and one or more receiving antennas for receiving a reflected signal received from an object.

Meanwhile, in order to form a virtual antenna aperture greater than an actual antenna aperture, the radar sensor according to the present embodiment may adopt a multi-dimensional antenna array and a MIMO signal transmission/reception method.

For example, in order to achieve horizontal and vertical angular precision and resolution, a 2D antenna array is used. When a 2D radar antenna array is used, signals are transmitted or received through two separate horizontal and vertical scans (time multiplexed), and MIMO can be used separately from the horizontal and vertical (time multiplexed) scans by a 2D radar.

More specifically, a radar apparatus according to the present embodiment may adopt a 2D antenna array configuration including a transmitting antenna unit which includes a total of 12 transmitting antennas Tx and a receiving antenna unit which includes a total of 16 receiving antennas Rx. As a result, the radar apparatus may have an arrangement of a total of 192 virtual receiving antennas.

In addition, in another embodiment, antennas of a radar sensor are disposed in a 2D antenna array, and for example, each antenna patch has a rhombus grid arrangement, thereby reducing unnecessary side lobes.

Alternatively, a 2D antenna arrangement may include a V-shape antenna array in which a plurality of radiating patches are disposed in a V-shape, and more specifically, may include two V-shape antenna arrays. In this case, a single feed is made at an apex of each V-shape antenna array.

Alternatively, a 2D antenna arrangement may include an X-shape antenna array in which a plurality of radiating patches are disposed in an X-shape, and more specifically, may include two X-shape antenna arrays. In this case, a single feed is made at a center of each X-shape antenna array.

In addition, in order to realize higher resolution and detection accuracy in vertical and horizontal directions, a radar apparatus according to the present embodiment may use a MIMO antenna system.

More specifically, in the MIMO system, respective transmitting antennas may transmit signals having independent waveforms that are different from each other. That is, each transmitting antenna may transmit a signal with an independent waveform different from those of signals of other transmitting antennas, and then each receiving antenna may determine which transmitting antenna transmits a reception signal reflected from an object due to the different waveforms of the signals.

Furthermore, a radar sensor according to the present embodiment may include a radar housing configured to accommodate a substrate including transmitting and receiving antennas and a circuit, and a radome configured to constitute an exterior of the radar housing. In this case, the radome may be formed of a material capable of decreasing the attenuation of radar signals transmitted or received and may constitute a front or rear bumper, a grille, or a side body of a vehicle or an exterior surface of a component of the vehicle.

That is, the radome of the radar apparatus may be disposed inside the bumper, the grille, or the body of the vehicle or may be disposed as a part of a component constituting the exterior surface of the vehicle, such as a part of the bumper, the grille, or the body of the vehicle. Therefore, the radome can improve the aesthetics of the vehicle and provide convenience in mounting the radar sensor.

A radar apparatus or a radar system used in the present disclosure may include at least one radar sensor unit, for example, at least one of a front detection radar sensor mounted on the front of a vehicle, a rear detection radar sensor mounted on the rear of the vehicle, and a side or side-rear detection radar sensor mounted on a side of the vehicle.

Such a radar sensor or radar system may process data by analyzing a transmission signal and a reception signal and thus extract information about an object. To this end, the radar sensor or radar sensor system may include an electronic control unit (ECU) or a processor. For data transmission or signal communication from the radar sensor to the ECU, a communication link such as a vehicle network bus or the like may be used.

Figure 11:
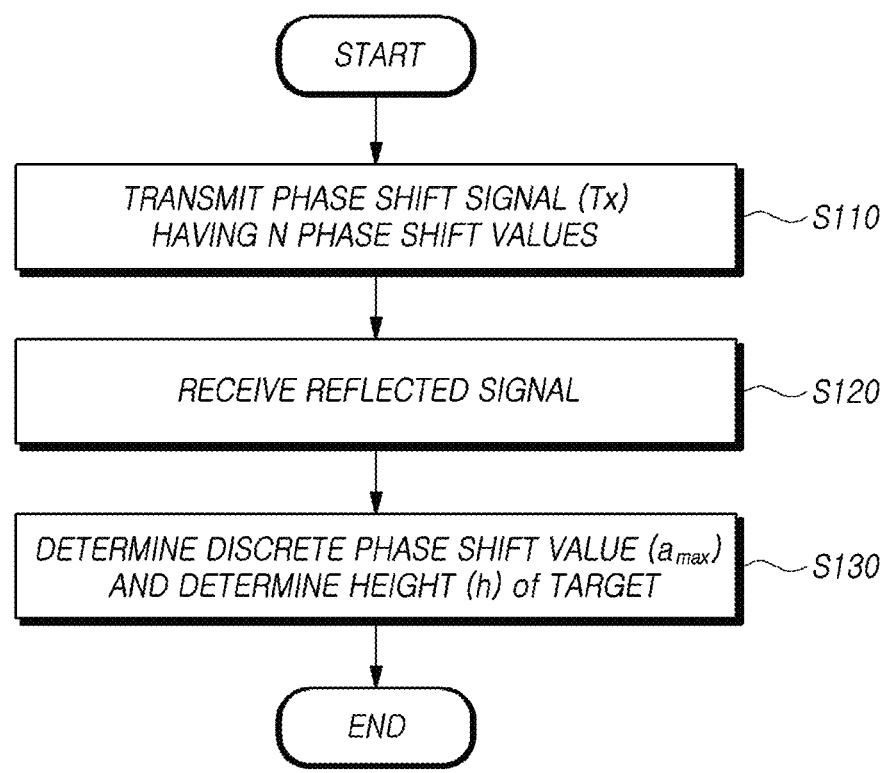
FIG. 11 is an overall flowchart of a method of controlling a radar apparatus according to the present embodiment.

FIG. 11 is an overall flowchart of a method of controlling a radar apparatus according to the present embodiment.

Referring to FIG. 11, the method of controlling a radar apparatus according to the present embodiment may include transmitting a phase shift transmission signal having N different phase shift values through Nt transmitting antennas (wherein Nt is a natural number that is greater than or equal to 2) (S110).

In addition, the method of controlling a radar apparatus according to the present embodiment may include receiving a reflected signal reflected from a target through Nr receiving antennas (wherein Nr is a natural number that is greater than or equal to 2) (S120), and determining a discrete phase shift value $a_{max}$ having the greatest reception power among N phase shift values to determine a height h of a target based on the determined discrete phase shift value $a_{max}$ (S130).

Since the structure of the antenna and the form of the phase shift transmission signal in operation 51110 are the same as those described with reference to FIGS. 5 to 9, detailed descriptions thereof will be omitted to avoid repetition.

In addition, operation S130 may be performed in a signal processor 300 of a radar apparatus. A maximum phase shift value â may be determined using the discrete phase shift value $a_{max}$, an elevation angle $\theta_{ele}$ of the target may be determined based on the maximum phase shift value â, and the height h of the target may be determined based on a distance R to the target and the elevation angle $\theta_{ele}$ of the target.

Figure 12:
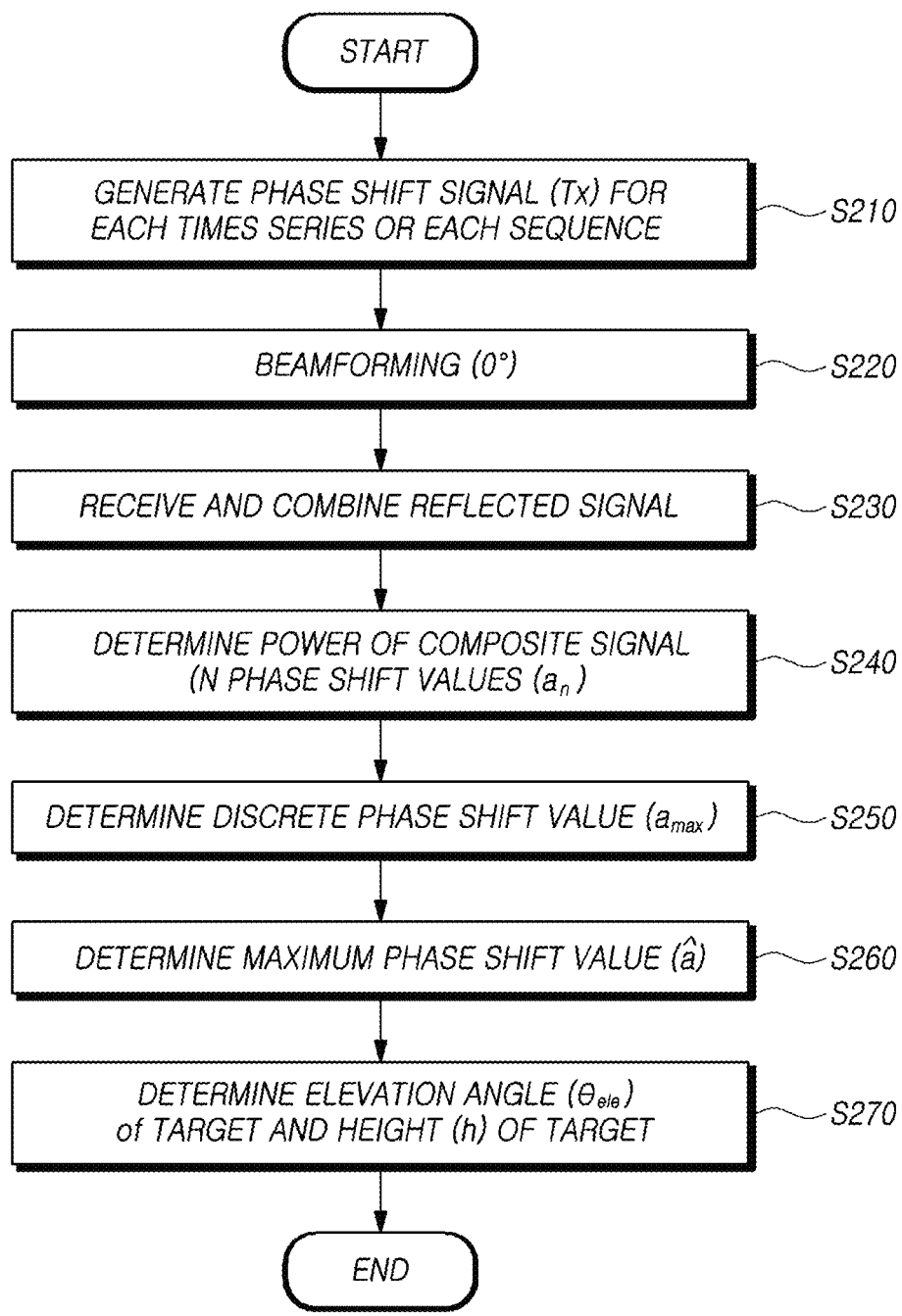
FIG. 12 is a flowchart of a method in which a radar apparatus determines a height of a target according to the present embodiment.

FIG. 12 is a flowchart of a method in which a radar apparatus determines a height of a target according to the present embodiment.

The radar apparatus according to the present embodiment generates a phase shift transmission signal having N phase shift values $a_n$ (S210). The phase shift transmission signal may be a transmission signal for each time series as shown in FIG. 8 or a transmission signal for each sequence as shown in FIG. 9.

The N phase shift values $a_n$ may be 360×n/N, and the phase shift transmission signal may include a in-phase chirp signal having a phase shift value and an inverted phase chirp signal having 180+phase shift value.

After beamforming is performed to face the front with respect to an azimuth angle of 0° using the generated phase shift transmission signal, a transmission beam is emitted (S220).

Next, a reflected signal reflected from a target is received and combined with the transmission signal (S230).

Thereafter, the power of a signal according to the N phase shift values is determined from a power spectrum of a reception signal or a composite signal (S240).

A signal processor 300 determines a phase shift value representing the greatest power among the N phase shift values $a_n$ as a discrete phase shift value $a_{max}$ using the power spectrum of the reception signal or the composite signal (S250).

Next, the signal processor 300 determines an accurate maximum phase shift value â from the discrete phase shift value $a_{max}$ (S260).

Specifically, the signal processor 300 may determine the accurate maximum phase shift value based on a power value or the like corresponding to a phase shift value having an index adjacent to an index of the discrete phase shift value $a_{max}$.

In this case, in order to determine the accurate maximum phase shift value â, an interpolation method such as a spline interpolation method or a 3-point estimation method may be used.

Next, the signal processor 300 may determine an elevation angle $\theta_{ele}$ of the target using the determined maximum phase shift value â and Equation 2 above and may determine an estimated height h of the target based on the elevation angle $\theta_{ele}$ of the target, a distance R to the target, and Equation 3 above (S1270).

Figure 13:
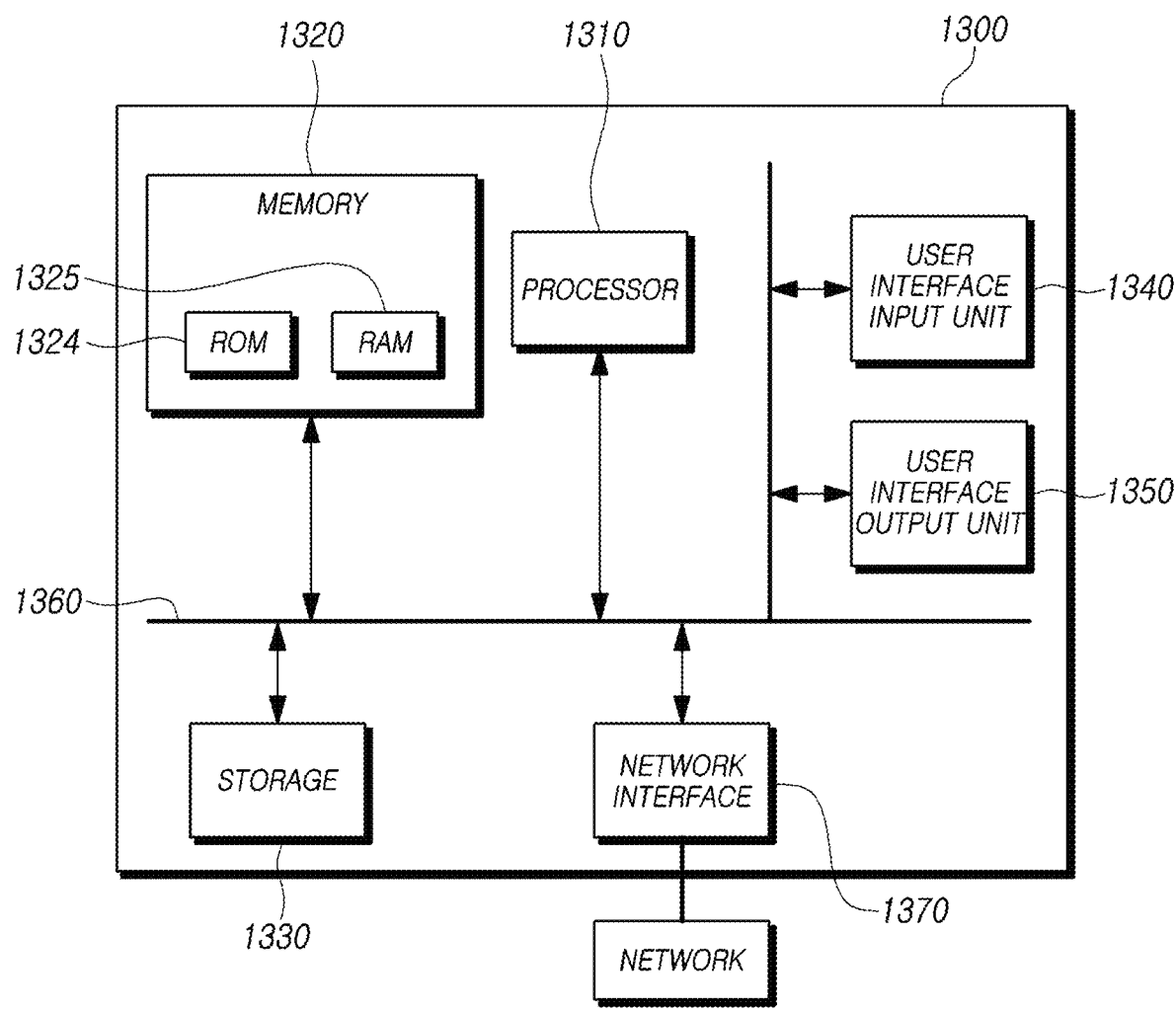
FIG. 13 illustrates an example of a hardware configuration of a transceiver and a signal processor included in a radar apparatus according to one embodiment.

FIG. 13 illustrates an example of a hardware configuration of a transceiver and a signal processor included in a radar apparatus according to one embodiment.

Referring to FIG. 13, the transceiver, the signal processor, or the like of the radar apparatus according to the above-described embodiments may be implemented with hardware or software implemented in a computer system.

That is, a controller of a transceiver 200 and a signal processor 300 of the above-described radar apparatus may be implemented as a computer device having hardware as shown in FIG. 13.

As shown in FIG. 13, a computer system 1300, which is an implementation form of the radar apparatus according to the present embodiment or the transceiver or signal processor included therein, may include one or more elements of one or more processors 1310, a memory 1320, a storage 1330, a user interface input unit 1340, and a user interface output unit 1350, and the elements may communicate with each other through a bus 1360.

In addition, the computer system 1300 may also include a network interface 1370 for connecting to a network. The processor 1310 may be a central processing unit (CPU) or a semiconductor device that executes processing instructions stored in the memory 1320 and/or the storage 1330. The memory 1320 and the storage 1330 may include various types of volatile/nonvolatile storage media. For example, the memory may include a read-only memory (ROM) 1324 and a random access memory (RAM) 1325.

In addition, a software module performing a function of generating/transmitting a phase shift transmission signal having N phase shift values, a software module performing a function of determining the power of a reception signal and determining a discrete phase shift value and a maximum phase shift value therefrom, a software module performing a function of determining elevation angle and height information of a target using the maximum phase shift value, and the like may be installed in the computer system 1300 used in the present embodiment.

The processor (main control unit (MCU)) 1310 of the radar apparatus according to the present embodiment may execute the above-described software module stored in the storage 1330 or the memory 1320 to perform a corresponding function.

As described above, when the radar apparatus according to the present embodiment is used, it is possible to determine accurate height information of a target in front of a vehicle using a transmission signal having N phase shift values and a transmitting antenna offset in a vertical direction.

Therefore, it is possible to accurately identify a superstructure such as a tunnel, a pier, or a pedestrian overpass positioned in front of a vehicle. Thus, by appropriately controlling the vehicle, precise vehicle driving control in autonomous driving or the like is possible.

Although it has been described above that all the components constituting embodiments of the present disclosure are combined into one component or are operated in combination, the present disclosure is not necessarily limited to the embodiments. That is, all the components may operate by selectively combining one or more components without departing from the scope of the present disclosure. In addition, each of all the components may be implemented with independent hardware, or a part or all of each of the components may be selectively combined and thus implemented with a computer program having program modules which perform some or all of combined functions in one or more pieces of hardware. Code and code segments constituting the computer program may be easily inferred by those skilled in the art. The computer program is stored in a computer-readable recording medium and read and executed by a computer, thereby implementing the embodiments of the present disclosure. The recording medium of the computer program may include magnetic recording media, optical recording media, and carrier wave media.

In addition, since terms, such as "including," "comprising," and "having" mean that corresponding components may be included unless explicitly described to the contrary, it shall be construed that other components are not precluded but may be further included. All terms including technical or scientific terms have the same meanings as commonly understood by those of ordinary skill in the art to the present disclosure belongs unless otherwise defined. Terms commonly used like those defined in dictionaries shall be construed to have meanings consistent with the contextual meaning of the related art, and shall not be construed in an ideal or excessively formal sense unless it is clearly defined in the present disclosure.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar apparatus comprising:
an antenna unit including Nt transmitting antennas and Nr receiving antennas, wherein one of the Nt transmitting antennas is vertically offset from the other transmitting antennas, or one of the Nr receiving antennas is vertically offset from the other receiving antennas, and Nt and Nr are natural numbers that are greater than or equal to 2;

a transceiver configured to control the Nt transmitting antennas to transmit a first transmission signal including a plurality of chirp signals having a same phase through a first transmission antenna among Nt transmitting antennas, and transmit a second transmission signal, which is a phase shift transmission signal having N different phase shift values ($a_n$), through a second transmission antenna among Nt trasnmitting antennas, and control the Nr receiving antennas to receive a reflected signal reflected from a target; and a signal processor configured to determine a height (h) of the target based on a discrete phase shift value ($a_{max}$) that is a phase shift value having greatest reception power among N phase shift values.

2. The radar apparatus of claim 1, wherein the transceiver divides the phase shift transmission signal having the N phase shift values by time index or sequence to transmit the phase shift transmission signal.

3. The radar apparatus of claim 2, wherein the N phase shift values of the phase shift transmission signal are 0°, (360/N)°, ((360×2)/N)°, . . . , and ((360×(N−1))/N)°.

4. The radar apparatus of claim 1, wherein the transceiver transmits the phase shift transmission signal through beamforming centered at an azimuth angle of 0°.

5. The radar apparatus of claim 1, wherein the signal processor determines a maximum phase shift value (â) using the discrete phase shift value ($a_{max}$) and determines the height (h) of the target based on the maximum phase shift value.

6. The radar apparatus of claim 5, wherein the signal processor determines an elevation angle ($\theta_{ele}$) of the target based on the maximum phase shift value (â) and determines the height (h) of the target based on a distance (R) to the target and the elevation angle ($\theta_{ele}$) of the target.

7. The radar apparatus of claim 2, wherein:
Nt is 2; and
the phase shift transmission signal comprises a plurality of fast chirp signals.

8. The radar apparatus of claim 7, wherein, when the time index is n, the phase shift transmission signal comprises a signal in which two fast chirp signals having phases of 0°+((360×n)/N)° and 180°+((360×n)/N)° are repeated, wherein n=0, 1, 2, . . . , and (N−1).

9. The radar apparatus of claim 7, wherein the phase shift transmission signal comprises 2×N fast chirp signals having phases of 0°, 0°+((360)/N)°, 0°+((360×2)/N)°, . . . , and 0°+((360×(N−1))/N)°, and 180°, 180°+((360)/N)°, 180°+((360×2)/N)°, . . . , and 180°+((360×(N−1))/N)°.

10. The radar apparatus of claim 1, wherein the transceiver forms (Nt−1)×Nr virtual receiving antennas.

11. A method of controlling a radar apparatus, the method comprising:
transmitting a first transmission signal including a plurality of chirp signals having the same phase through a first transmission antenna among Nt transmitting antennas, and transmits a second transmission signal, which is a phase shift transmission signal having N different phase shift values, through a second transmission antenna among the Nt transmitting antennas, wherein Nt is a natural number that is greater than or equal to 2;

receiving a reflected signal reflected from a target through Nr receiving antennas, wherein Nr is a natural number that is greater than or equal to 2; and determining a discrete phase shift value ($a_{max}$) which is a phase shift value having greatest reception power among the N phase shift values and determining a height (h) of the target based on the determined discrete phase shift value ($a_{max}$).

12. The method of claim 11, wherein one of the Nt transmitting antennas is vertically offset from the other transmitting antennas, or one of the Nr receiving antennas is vertically offset from the other receiving antennas.

13. The method of claim 12, wherein the transmitting of the phase shift transmission signal comprises dividing the phase shift transmission signal having the N phase shift values by time index or sequence to transmit the phase shift transmission signal.

14. The method of claim 12, wherein the N phase shift values of the phase shift transmission signal are 0°, (360/N)°, ((360×2)/N)°, . . . , and ((360×(N−1))/N)°.

15. The method of claim 12, wherein the transmitting of the phase shift transmission signal comprises transmitting the phase shift transmission signal through beamforming centered at an azimuth angle of 0°.

16. The method of claim 12, wherein the determining of the height (h) of the target comprises determining a maximum phase shift value (â) using the discrete phase shift value ($a_{max}$) and determining the height (h) of the target based on the maximum phase shift value.

17. The method of claim 16, wherein the determining of the height (h) of the target comprises determining an elevation angle ($\theta_{ele}$) of the target based on the maximum phase shift value (â) and determining the height (h) of the target based on a distance (R) to the target and the elevation angle ($\theta_{ele}$) of the target.

18. The method of claim 13, wherein:
Nt is 2; and
the phase shift transmission signal comprises a plurality of fast chirp signals.

19. The method of claim 18, wherein, when the time index is n, the phase shift transmission signal comprises a signal in which two fast chirp signals having phases of 0°+((360×n)/N)° and 180°+((360×n)/N)° are repeated, wherein n=0, 1, 2, . . . , and (N−1).

20. The method of claim 18, wherein the phase shift transmission signal comprises 2×N fast chirp signals having phases of 0°, 0°+((360)/N)°, 0° ((360×2)/N)°, . . . , and 0°+((360×(N−1))/N)°, and 180°, 180°+((360)/N)°, 180°+((360×2)/N)°, . . . , and 180°+((360×(N−1))/N)°.

* * * * *